(12) United States Patent
Amar Das et al.

(10) Patent No.: US 12,737,680 B2
(45) Date of Patent: Sep. 15, 2026

(54) SYSTEM AND METHOD FOR TRAINING FEDERATED LEARNING MODEL

(71) Applicant: Accenture Global Solutions Limited, Dublin (IE)

(72) Inventors: Kaushik Amar Das, Guwahati (IN); Kuntal Dey, Birbhum (IN); Kapil Singi, Bangalore (IN); Vikrant Kaulgud, Pune (IN); Sanjay Podder, Thane (IN); Gopal Sarma Pingali, Bangalore (IN); Teresa Sheausan Tung, Los Angeles, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 848 days.

(21) Appl. No.: 18/099,320

(22) Filed: Jan. 20, 2023

(65) Prior Publication Data

US 2024/0249179 A1 Jul. 25, 2024

(51) Int. Cl.

*G06N 3/098* (2023.01)
*G06F 9/50* (2006.01)
*G06N 20/00* (2019.01)

(52) U.S. Cl.

CPC ........... *G06N 20/00* (2019.01); *G06F 9/5055* (2013.01); *G06N 3/098* (2023.01); *G06F 2209/501* (2013.01); *G06F 2209/5011* (2013.01); *G06F 2209/503* (2013.01); *G06F 2209/509* (2013.01)

(58) Field of Classification Search

CPC ...... G06N 20/00; G06N 3/098; G06F 9/5055; G06F 2209/501; G06F 2209/5011; G06F 2209/503; G06F 2209/509

See application file for complete search history.

(56) References Cited

U.S. PATENT DOCUMENTS

| | | | | |
|---|---|---|---|---|
| 11,303,448 | B2 | 4/2022 | Schiatti et al. | |
| 11,456,914 | B2 * | 9/2022 | Doshi | G06F 8/61 |
| 2018/0183855 | A1 * | 6/2018 | Sabella | H04L 67/04 |
| 2019/0220703 | A1 * | 7/2019 | Prakash | G06N 3/09 |
| 2022/0156574 | A1 * | 5/2022 | Anwar | G06N 3/08 |
| 2022/0300618 | A1 * | 9/2022 | Ding | G06N 5/01 |

(Continued)

OTHER PUBLICATIONS

Peter Kairouz et al. "Advances and Open Problems in Federated Learning," arXiv:1912.04977v3 [cs.LG] Mar. 9, 2021.

(Continued)

*Primary Examiner* — Beau D Spratt

(74) *Attorney, Agent, or Firm* — Mannava & Kang, P.C.

(57) ABSTRACT

A method and system for training a federated learning model are disclosed. The method may include receiving the global federated learning model from the server via the client. The client may control remote computing resources. The method may further include identifying a spare computing instance from the remote computing resources and determine a threshold training load for training the global federated learning model based on a training load assigned to the client. The method may further include, in response to a processing capacity of the spare computing instance being sufficient to process the threshold training load, offloading the threshold training load to the spare computing instance and training the global federated learning model on the spare computing instance with the training dataset stored in a data source maintained by the client.

19 Claims, 6 Drawing Sheets

(56) References Cited

U.S. PATENT DOCUMENTS

| | | | | |
|---|---|---|---|---|
| 2023/0083982 A1* | 3/2023 | Xin | H04L 41/16 | 709/223 |
| 2023/0090731 A1* | 3/2023 | Kang | G06F 21/6245 | 706/12 |
| 2023/0316090 A1* | 10/2023 | Chakraborty | G06F 9/54 | 706/15 |

OTHER PUBLICATIONS

"Optimizing and Scaling Machine Learning Training with Managed Spot Training for Amazon SageMaker," https://aws.amazon.com/getting-started/hands-on/managed-spot-training-sagemaker/, Nov. 22, 2022.

"Private Hub: The GitHub of Machine Learning," https://huggingface.co/platform, Nov. 22, 2022.

Azure Machine Learning, "Enterprise-Grade Machine Learning Service to Build and Deploy Models Faster," Nov. 2022.

"A Federated Learning Platform that Helps Aggregate Models Trained on Completely Separate and Private Data Sources," https://intellegens.com/products-services/ichnite/, Nov. 22, 2022.

Peter Kairouz et al. "Advances and Open Problems in Federated Learning," 2021, hal-02406503v2.

Hind Bangui et al. "Multi-Criteria Decision Analysis Methods in the Mobile Cloud Offloading Paradigm," Journal of Sensor and Actuator Networks, 2017, 6, 25; doi: 10.3390/jsan6040025.

Brendan McMahan et al. "Federated Learning: Collaborative Machine Learning without Centralized Training Data," https://ai.googleblog.com/2017/04/federated-learning-collaborative.html, Apr. 6, 2007.

"Amazon EC2 Spot Instances," https://web.archive.org/web/20221119205430/https://aws.amazon.com/ec2/spot/, Nov. 19,2022.

"NeurIPS 2019 Expo Talk," https://web.archive.org/web/20220617204427/https://neurips.cc/ExpoConferences/2019/sche . . . , Nov. 28, 2022.

* cited by examiner

SYSTEM AND METHOD FOR TRAINING FEDERATED LEARNING MODEL

TECHNICAL FIELD

This disclosure relates generally to artificial intelligence, and in particular to training a federated learning model.

BACKGROUND

A variety of devices such as cell phones, Internet of Things (IoT) sensors, wearable devices, etc., generate a wealth of data every day. While the data in the devices present an attractive source for training machine learning models, it is not always feasible to centrally collect and store such local data due to privacy concerns. To overcome this obstacle, the Federated Learning (FL) paradigm was proposed. Improvements in federated learning may be desirable.

SUMMARY

This disclosure relates to systems and methods for training a federated learning model.

In one embodiment, a method for training a federated learning model in a federated learning network is disclosed. The federated learning network may include a server and a plurality of clients. The server may maintain a global federated learning model. The plurality of clients may separately maintain decentralized data sources. The data sources may separately store training datasets for the global federated learning model. The method may be performed by a processor circuitry in communication with a client.

The method may include receiving the global federated learning model from the server via the client. The client may control remote computing resources. The method may further include identifying a spare computing instance from the remote computing resources and determining a threshold training load for training the global federated learning model based on a training load assigned to the client. The threshold training load is a subset of the assigned training load. The method may further include, in response to a processing capacity of the spare computing instance being sufficient to process the threshold training load, offloading the threshold training load to the spare computing instance and training the global federated learning model on the spare computing instance with the training dataset stored in a data source maintained by the client.

In another embodiment, a system for training a federated learning model in a federated learning network is disclosed. The federated learning network may include a server and a plurality of clients. The server may maintain a global federated learning model. The plurality of clients may separately maintain decentralized data sources. The data sources may separately store training datasets for the global federated learning model.

The system may include a memory having stored thereon executable instructions and a processor circuitry in communication with the memory. When executing the instructions, the processor circuitry may be configured to receive the global federated learning model from the server via the client. The client may control remote computing resources. The processor circuitry may be further configured to identify a spare computing instance from the remote computing resources and determine a threshold training load for training the global federated learning model based on a training load assigned to the client. The threshold training load is a subset of the assigned training load. The processor circuitry may be further configured to, in response to a processing capacity of the spare computing instance being sufficient to process the threshold training load, offload the threshold training load to the spare computing instance and train the global federated learning model on the spare computing instance with the training dataset stored in a data source maintained by the client.

In another embodiment, a product for training a federated learning model in a federated learning network is disclosed. The federated learning network may include a server and a plurality of clients. The server may maintain a global federated learning model. The plurality of clients may separately maintain decentralized data sources. The data sources may separately store training datasets for the global federated learning model.

The product may include non-transitory machine-readable media and instructions stored on the machine-readable media. When being executed, the instructions may be configured to cause a processor circuitry to receive the global federated learning model from the server via the client. The client may control remote computing resources. The instructions may be further configured to cause the processor circuitry to identify a spare computing instance from the remote computing resources and determine a threshold training load for training the global federated learning model based on a training load assigned to the client. The threshold training load is a subset of the assigned training load. The instructions may be further configured to, in response to a processing capacity of the spare computing instance being sufficient to process the threshold training load, offload the threshold training load to the spare computing instance and train the global federated learning model on the spare computing instance with the training dataset stored in a data source maintained by the client.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

Figure 1:
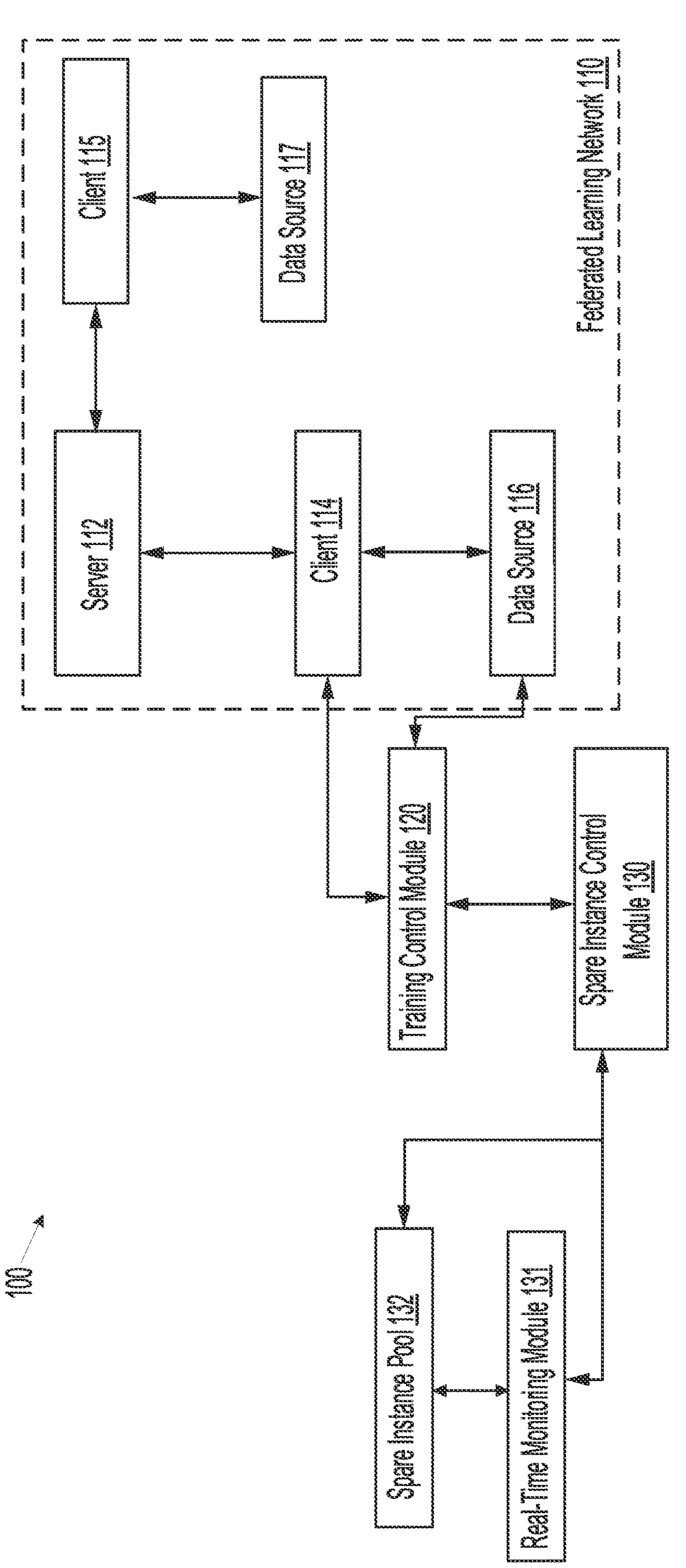
FIG. 1 shows an exemplary system for training a federated learning model.

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in an embodiment" or "in an implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

Federated learning is a machine learning setting where multiple entities (or clients) collaborate in solving a machine learning problem, under the coordination of a central server or service provider. Each client's raw data is stored locally and not exchanged or transferred. Instead, focused updates intended for immediate aggregation are used to achieve the learning objective. It is obvious that FL provides a convenient way to train a machine learning model without sharing any data. In its simplest form, the central server initializes a "global" model which is sent to the participating clients. These clients hold the data and can be anything such as a device or an organization. Each of them then trains the model using their local data and send back the updates to the central server who then aggregates them to improve the global model. This goes on for some iterations until the model converges.

It is known in the art that training a machine learning model would consume considerable computing resources which may not always be available. Motivated by this issue, the present disclosure proposes FL model training methods and systems which can be leveraged to perform the client-side training of FL in cost effective manner without hindering the performance of the application generating the local data. In some implementations, the proposed methods and systems offload the client-side training to remote computing resources such as spare computing instances. The spare computing instances may be spare capacity in the cloud which may be leveraged with lower cost, for example, Amazon Web Services (AWS) Spot Instances and Microsoft Azure® Spot Virtual Machines.

While using spare computing instances for FL model training, it comes with its own challenges, for instance, dealing with instance interruptions, and ensuring that the training is robust to interruptions and dealing with system's heterogeneity since the instance configurations may not be identical across multiple vendors. The present disclosure addresses these issues in a novel way.

One interesting feature of the systems and methods for training federated learning model described below may be that it delegates the training load assigned to the client to the remote computing resources like the spare computing instances. In other words, the client does not make use of its local computing resources to perform the training load. Rather, the training load is offloaded to the remote spare computing instances. Utilizing the remote spare computing instances for the FL model training would save local resources of the client for other high priority tasks. Additionally, in view of the fact that the spare computing instances may not be always available to the FL model training, the systems and methods make a balance between the computing resource availability limitation and the effectiveness of the FL model training by pursuing a partial training but still meeting a threshold for training acceptability.

FIG. 1 shows exemplary architecture 100 for training a federated learning model in a federated learning network 110. The federated learning network 110 may include the server 112, clients 114/115, and data sources 116/117. The server 112 may maintain a global federated learning model including coordinating the federated learning model training by the clients 114/115 and updating the global model by aggregating model updates received from the clients 114/115. The clients 114/115 may separately maintain decentralized data sources 116/117 which may store training datasets for the global federated learning model. A client may represent any applications, devices, or systems facilitating to collaborate with the server to update the global federated learning model. The client may include, for example, a web browser, a mobile application, a computer, a tablet, a laptop, a smartphone, or any local computing resources of an entity or organization. In some implementations, the client may control or communicate with remote computing resources, for example, the spot instances on the cloud. Here, two clients are shown for purpose of illustration. It would be appreciated that the federated learning network 110 may include more clients that can participate in the training of the federated learning model.

The architecture 100 may further include training control module 120, spare instance control module 130, real-time monitoring module 131, and spare instance pool 132. The modules may operate collaboratively to train a federated learning model as discussed in the present disclosure.

Herein, the term module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the unit. A module is configured to perform functions and achieve goals such as those described in this disclosure, and may work together with other related modules, programs, and components to achieve those functions and goals.

Figure 2:
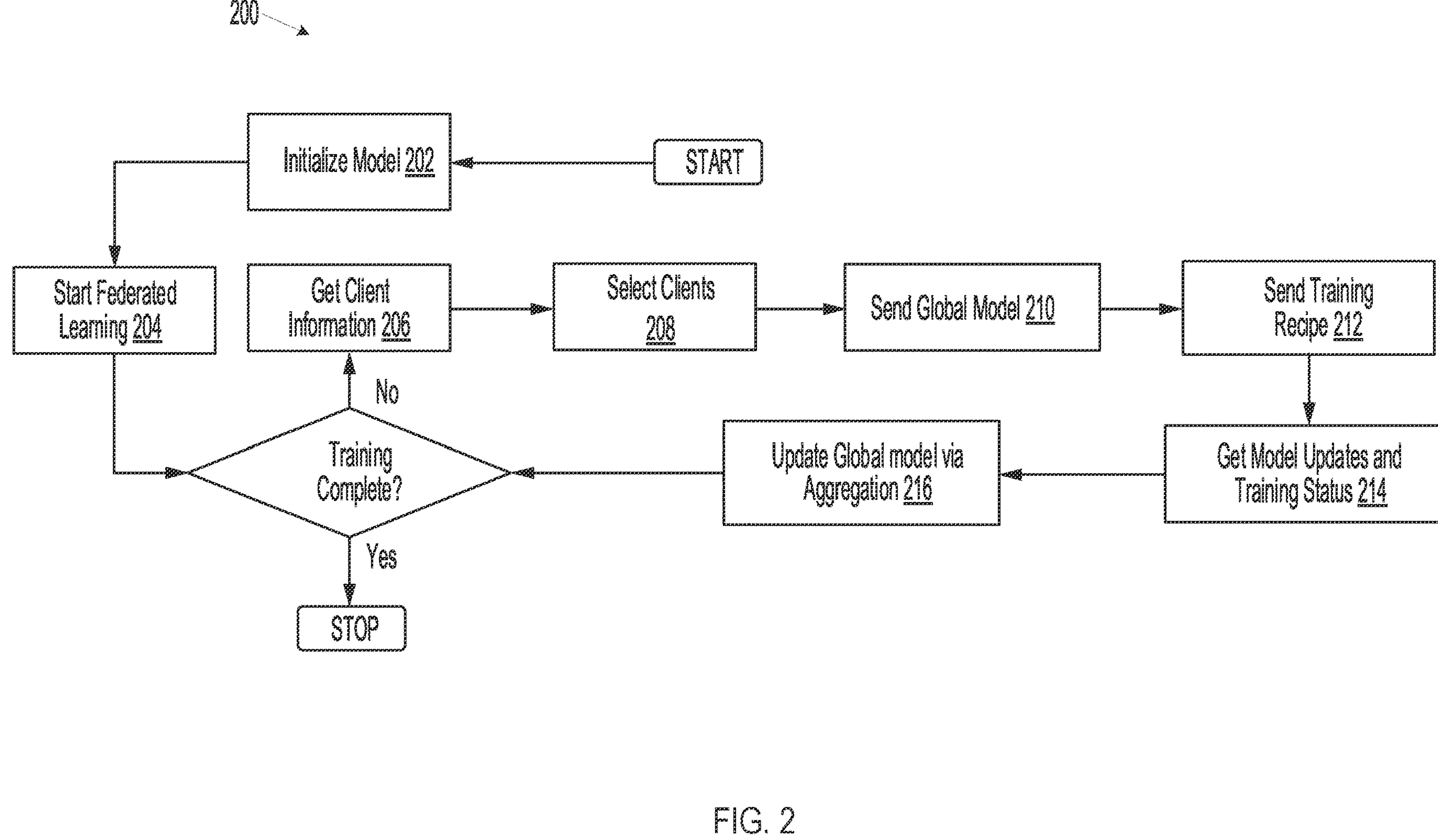
FIG. 2 shows an exemplary logic of the server for training the federated learning model.

FIG. 2 shows an exemplary FL model training logic 200 performed by the server 112. The server 112 may initialize a global FL model to be trained (202). In some implementations, the server 112 may also initialize the training recipe which is also referred to as training parameters. The training recipe may include the selection of machine learning optimizer such as stochastic gradient descent and its parameters such as batch size and learning rate. Then, the server 112 may trigger to start the FL model training for multiple iterations (204).

The server 112 may determine whether the FL training has been completed by checking if the trained model has met predetermined criteria, for example, the trained model reaching a desired convergence. If the training is not complete, the server 112 may obtain client information of the clients in the FL network 110 (206). The client information may include, for example, the availability of a client to the FL training, the training load that a client can undertake, and the like. Based on the client information, the server 112 may select one or more clients for the FL training (208) and send a copy of the global FL learning model to the selected clients (210). In some implementations, the server 112 may also send the training recipe for the global FL learning model to the clients (212). In other implementations, the server 112 may not send the training recipe to a client 114 and instead the client 114 may use its own training recipe for training the FL learning model.

The server 114 may collect trained updates of the global FL model from the selected clients (214), aggregate the trained updates, and use the aggregated updates to update the global FL model (216). In an implementation, the server 112 may utilize an aggregation algorithm, such as the Federated Averaging (FedAvg) algorithm, to aggregate the model updates. If the updated global FL model does not reach the desired convergence, the server 112 may proceed to select clients and send the updated global FL model to the clients for the next iteration of training until the training is complete.

In some implementations, as the client may delegate the training of the FL model to the remote spare computing instances such as spot virtual machines (VMs) and the spot VMs may have different or heterogenous processing capacities, it is desirable for the server 112 to use one of the following federated learning frameworks for the model update aggregation: FedProx, FedNova, and HeteroFL.

Figure 3:
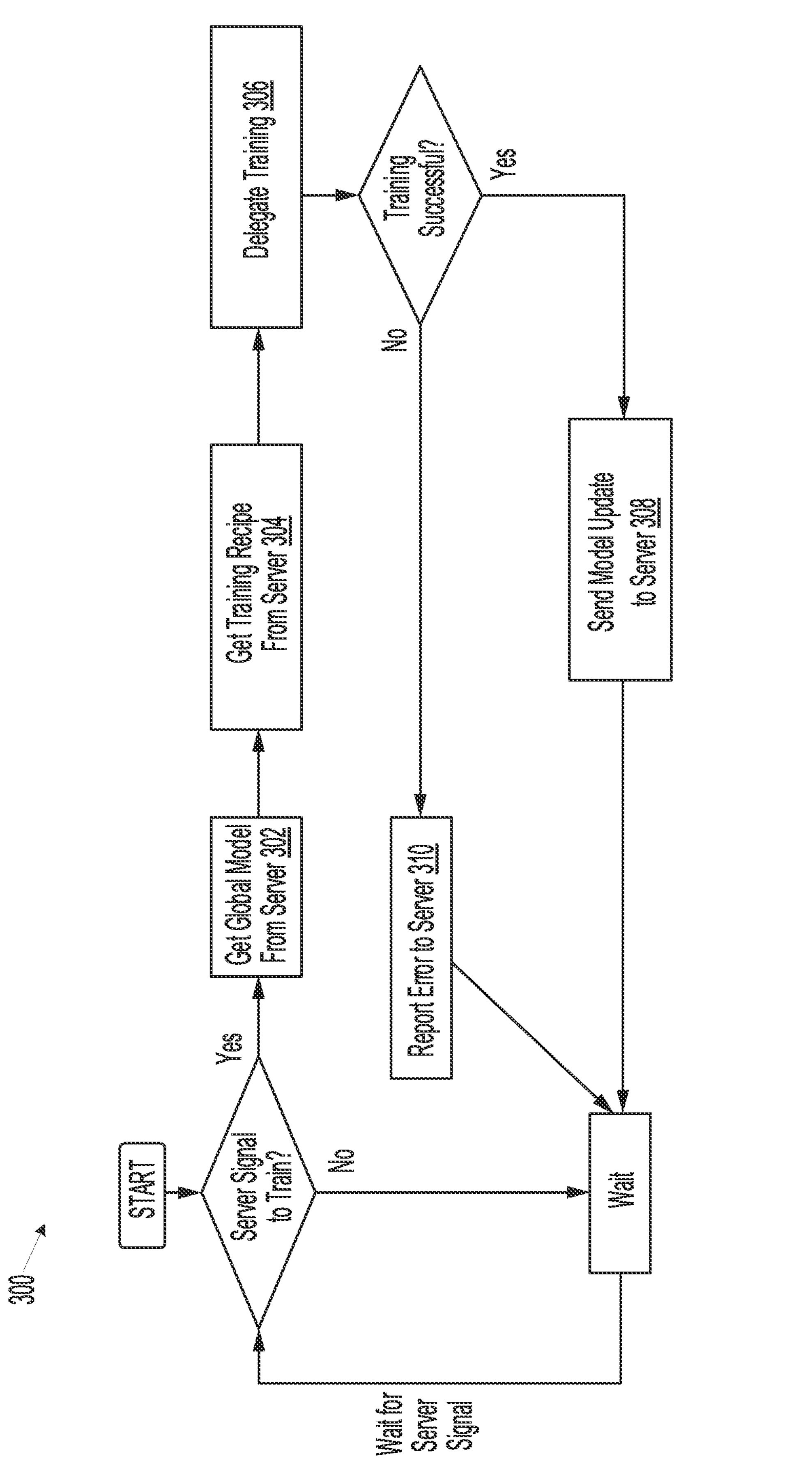
FIG. 3 shows an exemplary logic of the client for training the federated learning model.

FIG. 3 shows an exemplary FL model training logic 300 performed by the client 114. The client 114 is the data holder contributing to the improvement of the global FL model by allowing the model to be trained using the client's local data and sending the trained updates of the model to the server 112. The client 114 may notify the server 112 that it is available for the FL model training and wait for the signal from the server 112 indicating that this client is selected for the FL model training. Where the client 114 is selected, the client 114 may receive the global FL learning model to be trained from the server 112 (302) and optionally receive the training recipe for the FL learning model (304).

Then, the client 114 may delegate the training load for training the global FL model to the spare computing instances such as the spot VMs on the cloud (306). In other words, the client 114 does not make use of its local computing resources to perform the training load assigned to the client 114 by the server 112. Rather, the remote spare computing instances are used to complete the training load. In some cases, the remote spare computing instances may not always be available to the training and may be interrupted to execute other urgent tasks in the course of the training. As a result, the training may not be fully complete.

However, partially trained models may be still useful to update the global FL model. If the training load is $\eta$ epochs, it might still be acceptable to finish only $\eta_{min}$ epochs where $\eta_{min} \leq \eta$. For example, if the training load $\eta$ is 10 epochs and minimum threshold for training acceptability is 50%, the client 114 may be expected to complete at least 5 epochs of training, i.e., the threshold training epochs $\eta_{min}$. An epoch in machine learning may represent one complete pass of the training dataset through the training algorithm. With each epoch, the training dataset's internal model parameters are updated.

A spare computing instance may not always be available to the FL model training. For example, a spare computing instance that is performing the FL model training may be interrupted or pre-empted to perform other tasks. To protect against the interruption or pre-emption of a spare computing instance for training the FL model, redundant spare computing instances are desirable. In some implementations, the client 114 may create additional spare computing instances in the spare computing instance pool to introduce the redundancy. For example, if the degree of redundancy $\delta$ is 2, two spare computing instances may be used as backup for performing the training. Then, the client 114 may send the global FL model received from the server 112, the training recipe, the threshold training epochs $\eta_{min}$, and the degree of redundancy $\delta$ to the training control module 120, which will collaborate with the spare instance control module 130 to utilize the remote spare computing instances to complete the training load assigned to the client 114. The training control module 120 and the spare instance control module 130 may be deployed locally on the client 114. Alternatively, or additionally, the training control module 120 and the spare instance control module 130 may be deployed remotely, for example, on the cloud. The functions of the training control module 120 and the spare instance control module 130 will be discussed in detail later.

The client 114 may communicate with the spare instance control module 130 to determine whether the training is successful. If the training is successful, the client 114 may send the trained model update to server 112 (308). Otherwise, the client 114 may report a training failure to the server 112 (310).

Figure 4:
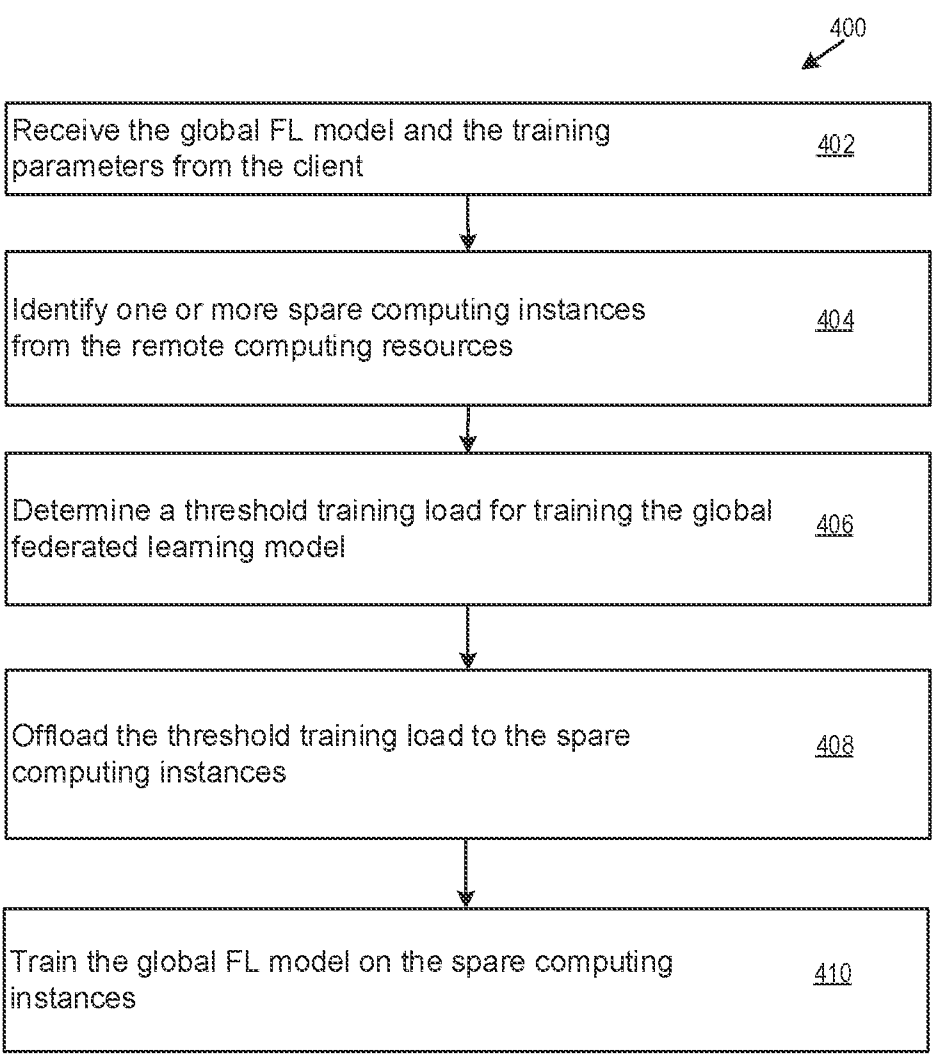
FIG. 4 shows an exemplary logic for training the federated learning model on the spare computing instances.

FIG. 4 shows an exemplary FL model training logic (FLMTL) 400, which may be performed on the training control module 120 and the spare instance control module 130. The logical features of the FLMTL 400 may be implemented in various orders and combinations. For example, in a first implementation, one or more features may be omitted or reordered with respect to a second implementation. The logical features will be discussed with reference to the modules in FIG. 1.

On the training control module 120, the FLMTL 400 may receive the global FL model and the training parameters from the client 114 (402) and identify one or more spare computing instances from the remote computing resources (404). In an implementation, the spare instance pool 132 may maintain candidate spare computing instances such as spot VMs available to the training. On the spare instance control module, the FLMTL 400 may obtain the candidate spare computing instances from the spare instance pool 132 and select one or more spare computing instances from the candidate spare computing instances.

Where the FLMTL 400 selects a plurality of spare computing instances, the FLMTL may make the selection based on instance types of the spare computing instances. It is desirable that the selected spot VMs are of different instance types, because each of the instance types has different eviction rates and selecting spot VMs with different instance types may prevent all the selected spot VMs from getting pre-empted simultaneously, which may ensure at least some of the selected spot VMs are available to perform the FL training load. In an implementation, the FLMTL 400 may perform the selection based on weighted multiple-criteria decision analysis (MCDA). For example, each of the candidate spare computing instances has the same selection priority in the beginning. Where a spare computing instance belonging to a specific instance type is selected, the FLMTL 400 will decrease a selection priority of other spare computing instances belonging to the specific instance type. In some cases, each of the selected spare computing instances has a different instance type.

Alternatively, or additionally, the FLMTL 400 may select the plurality of spare computing instances from the candidate spare computing instances based on consumption metrics. The consumption metrics may include the cost of the spare computing instance and the proportion of renewable energy used by the spare computing instance. Each of the consumption metrics may be assigned a weight, which may indicate the influence factor of the consumption metric in selecting the proper spare computing instances. The weights for the consumption metrics may be either predetermined or dynamically assigned by the client. In an implementation, the FLMTL 400 may make use of Multiple Criteria Decision Analysis (MCDA) to rank the spare computing instances and select a spare computing instance with the highest rank. MCDA is a method used to analyze multiple conflicting options to determine the best alternative. Where multiple spare computing instances has the highest rank, the FLMTL 400 may select any one or more of the multiple spare computing instances for the FL training.

In an example, the FLMTL 400 may make use of Technique for Order of Preference by Similarity to Ideal Solution (TOPSIS) to determine the weights for the consumption metrics. TOPSIS is a MCDA method based on the concept that the chosen alternative should have the shortest geometric distance from the positive ideal solution and the longest geometric distance from the negative ideal solution. The client may specify how much they care about each of the consumption metrics, which may be quantified with weights. The client may also specify how it would like to optimize a consumption metric, for example, maximizing or minimizing the consumption metric, which may be referred to as the optimization criteria. TOPSIS may take the weights and the optimization criteria of the consumption metrics into account to calculate the ranking of the spare computing instances. For instance, the cost metric is assigned a weight of 0.7 while the renewable energy metric is assigned a weight of 0.3, which may indicate that the client cares more about decreasing the cost of spare computing instances and less about increasing the use of renewable energy.

Table 1 illustrates the ranking of three spare computing instances Alt1, Alt2, and Alt3 based on the consumption metrics at different time period. As shown in the table, at time to, Alt1 ranks first in terms of the consumption metrics and it is desirable to select Alt1 for the FL training. At time t1, Alt2 ranks first in terms of the consumption metrics and the FLMTL 400 may select Alt2 for the FL training. It would be appreciated that the FLMTL 400 may make use of other consumption metrics of the spare computing instance, alone or in combination with the cost of the spare computing instance and/or the proportion of renewable energy used by the spare computing instance to select the proper spare computing instances.

TABLE 1

Exemplary Rankings Based on Consumption Metrics

| | Cost ($) | | | Renewable Energy (%) | | | |
|---|---|---|---|---|---|---|---|
| Time | Alt1 | Alt2 | Alt3 | Alt1 | Alt2 | Alt3 | Ranking |
| $t_0$ | 4.65 | 5.67 | 4.60 | 50 | 35 | 30 | Alt1, Alt3, Alt2 |
| $t_1$ | 7.65 | 4.67 | 4.60 | 50 | 35 | 30 | Alt2, Alt3, Alt1 |
| $t_2$ | 5.65 | 5.67 | 4.60 | 60 | 55 | 47 | Alt3, Alt1, Alt2 |

Then, the FLMTL 400 may determine a threshold training load for training the global federated learning model based on a training load assigned to the client 114 (406). The threshold training load is a subset of the assigned training load. For example, for an effective training, at least 50% of the training load assigned to the client 114 needs to be completed and the assigned training load $\eta$ is 20 epochs. The FLMTL 400 may determine that the threshold training load $\eta_{min}$ is 10 epochs.

Where the processing capacity of the spare computing instances selected for the FL training is sufficient to process the threshold training load, the FLMTL 400 may offload the threshold training load to the spare computing instances (408). In an implementation, the FLMTL 400 may divide the threshold training load among the spare computing instances based on processing capacities of the spare computing instances and offload the divided threshold training load to the spare computing instances respectively. For example, a spot VM that has a higher processing capacity are assigned more epochs. Then, the FLMTL 400 may train the global FL model on the spare computing instances with the training dataset stored in a data source 116 maintained by the client 114 (410). For example, the FLMTL 400 may send the global FL model, the training recipe and the training dataset stored in the client 114 to the spare computing instances for training.

On the other hand, the FLMTL 400 may determine that the aggregate processing capacity of the spare computing instances is insufficient to process the threshold training load. Then, the FLMTL 400 may refrain from training the global FL model and report a failure of training the global FL model to the server 112. In an example, the FLMTL 400 may report the failure to the client 114 which may relay the failure message to the server 112.

After completing the threshold training load on the spare computing instances, the FLMTL 400 may obtain a partially trained model update corresponding to the threshold training load. In an implementation, the FLMTL 400 may obtain the partially trained model updates corresponding to the threshold training load from the spare computing instances respectively and average the trained model updates as the partially trained model update corresponding to the threshold training load.

After the completion of the threshold training load, the FLMTL 400 may check the availability of the spare computing instances on the spare instance control module 130. For example, the FLMTL 400 may obtain the availability information of the spare computing instances from the real-time monitoring module 131, which may monitor the availability of the spare computing instances in the spare instance pool 132 in real time.

Where one or more spare computing instances becomes unavailable for the FL model training or the processing capacity of the spare computing instances becomes insufficient to process the remainder of the assigned training load, the FLMTL 400 may transmit the partially trained model update to the server 112 via the client 114. The partially trained model update may be aggregated into an updated global FL model on the server 112.

Where at least one of the spare computing instances is still available for the FL model training and the processing capacity of the available spare computing instances is sufficient to process the remainder of the assigned training load, the FLMTL 400 may offload the remainder of the assigned training load to the available spare computing instances. In an implementation, the FLMTL 400 may divide the remainder of the assigned training load among the available spare computing instances based on processing capacities of the available spare computing instances and offload the divided remainder of the assigned training load to the available computing instances, respectively, for the FL model training.

Figure 5:
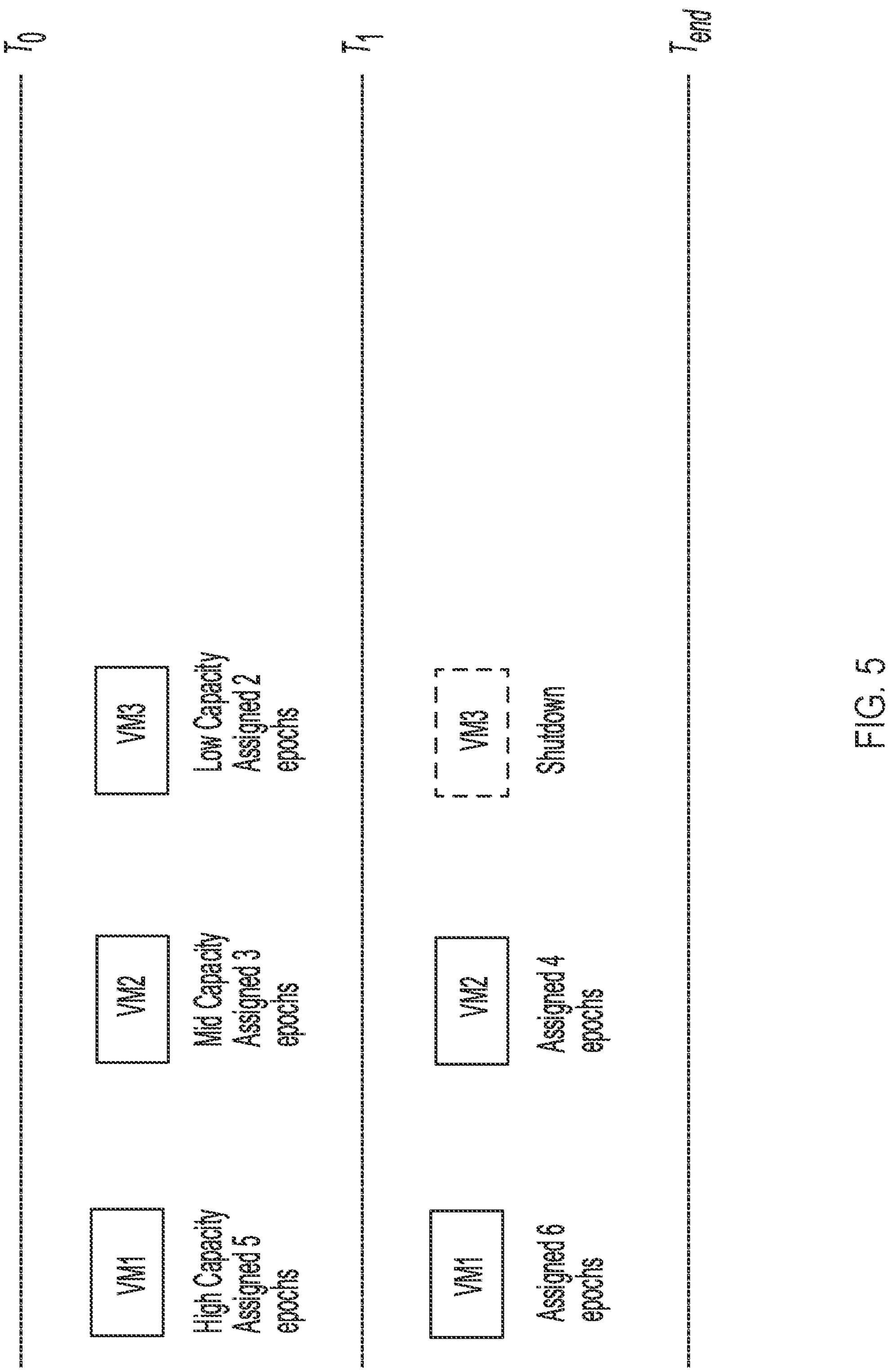
FIG. 5 shows an exemplary training load division among the spare computing instances.

In an example, as shown in FIG. 5, three spot VMs, VM1, VM2, and VM3, split the ten-epoch threshold training load in the beginning $T_0$. The VM1, VM2, and VM3 are assigned five epochs, three epochs, and two epochs, respectively, based on their processing capacities. At $T_1$, the three spot VMs collectively complete the threshold training load and only VM1 and VM2 are still available for the remainder of the assigned training load which is the other ten epochs. In this case, the FLMTL 400 may divide the other ten epochs between VM1 and VM2. For example, the VM1 is assigned six epochs while the VM2 is assigned four epochs.

Where the available spare computing instances collectively complete the remainder of the assigned training load, the FLMTL 400 may obtain a completely trained model update corresponding to the assigned training load. In an implementation, the FLMTL 400 may obtain trained model updates corresponding to the assigned training load from the spare computing instances and average the trained model updates as the completely trained model update corresponding to the assigned training load. Then, the FLMTL 400 may transmit the completely trained model update to the server 112, for example, via the client 114. The completely trained model update may be aggregated into an updated global FL model on the server 112.

In some cases, one of the spare computing instances involved in the FL model training may become unavailable during the FL model training. For example, the spare computing instance is interrupted or pre-empted to perform other tasks with higher priority. To continue to complete the training load, the FLMTL 400 may obtain the remaining training loads that the spare computing instance fails to complete, divide the remaining training load among others of the spare computing instances still working on the FL model training, and offload the divided training load to the other spare computing instances respectively.

In some cases, all of the spare computing instances involved in the FL model training become unavailable during training, or an aggregate processing capacity of the still available spare computing instances is insufficient to process the uncompleted training load. To complete the FL model training, the FLMTL 400 may select and instantiate additional spare computing instances, for example, the redundant spare computing instances from the spare instance pool 132 to complete the uncompleted training load. Where the FLMTL 400 fails to instantiate the additional spare computing instances, the FLMTL 400 may end the training and report the training failure to the client 114 which may relay the failure report to the server 112.

Furthermore, the availability of the spare computing instances at the client 114 may vary with time and other factors. Accordingly, the number of spare computing instances that the client may be able to procure varies in different time periods. Also, the procured spare computing instances may get interrupted during training. All these factors together affect the performance of the FL model training. Therefore, arbitrarily starting a training round may result in a training failure thereby wasting valuable time and resources. To address this issue, the FLMTL 400 may analyze the historical records of the previous FL training rounds to determine a proper timing to initialize the FL model training. For example, during the proper timing, the spare computing instances involved in the FL model training are least likely interrupted or pre-empted. In an implementation, the FLMTL 400 may utilize a machine learning model to predict a proper time to initialize a training round based on the historical training records of the spare computing instances. In this way, the FL model training may be performed with the least number of interruptions or pre-emptions.

Figure 6:
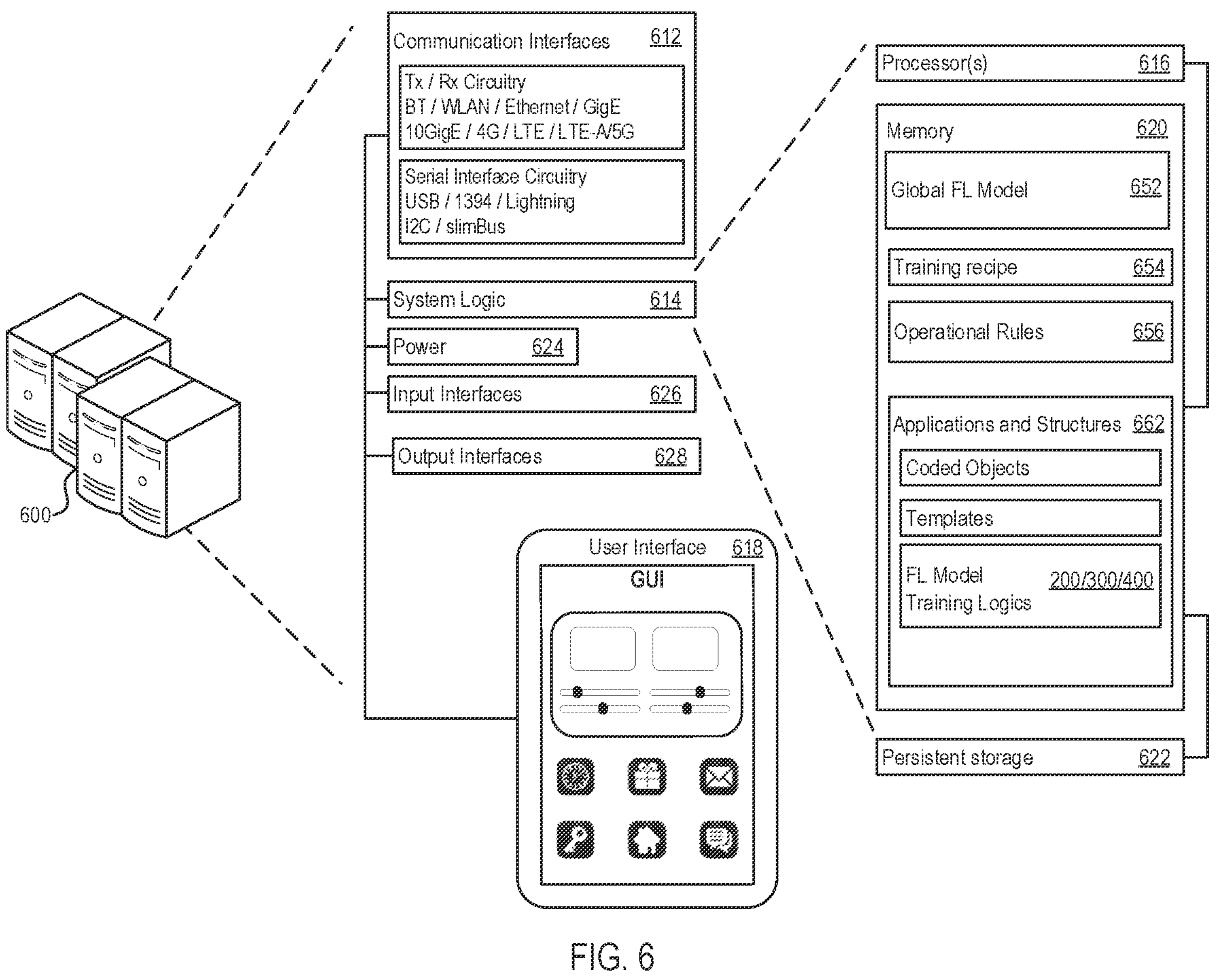
FIG. 6 shows an exemplary specific execution environment for executing the logic for training the federated learning model.

FIG. 6 shows an exemplary specific execution environment for executing the FL model training logics 200, 300, and 400 as described above. The execution environment 600 may include system logic 614 to support execution of the logics described above. The system logic 612 may include processors 616, memory 620, and/or other circuitries. The memory 620 may include global federated learning model 652, training recipe 654, and operational rules 656. The memory 520 may further include applications and structures 662, for example, coded objects, machine instructions, templates, or other structures to support identifying spare computing instances from remote computing resources, determining a threshold training load for training the global FL model, offloading the training load to the spare computing instances, or other tasks described above. The applications and structures may implement the FL model training logics 200, 300, and 400.

The execution environment 600 may also include communication interfaces 612, which may support wireless, e.g. Bluetooth, Wi-Fi, WLAN, cellular (4G, LTE/A, 5G), and/or wired, Ethernet, Gigabit Ethernet, optical networking protocols. The communication interfaces 612 may also include serial interfaces, such as universal serial bus (USB), serial ATA, IEEE 1394, lighting port, I2C, slimBus, or other serial interfaces. The execution environment 600 may include power functions 624 and various input interfaces 626. The execution environment may also include a user interface 618 that may include human-to-machine interface devices and/or graphical user interfaces (GUI). In some implementations, the system logic 614 may be distributed over one or more physical machines or be implemented as one or more virtual machines.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In general, terminology may be understood at least in part from usage in context. For example, terms, such as “and”, “or”, or “and/or,” as used herein may include a variety of meanings that may depend at least in part upon the context in which such terms are used. Typically, “or” if used to associate a list, such as A, B or C, is intended to mean A, B, and C, here used in the inclusive sense, as well as A, B or C, here used in the exclusive sense. In addition, the term “one or more” or “at least one” as used herein, depending at least in part upon context, may be used to describe any feature, structure, or characteristic in a singular sense or may be used to describe combinations of features, structures or characteristics in a plural sense. Similarly, terms, such as “a”, “an”, or “the”, again, may be understood to convey a singular usage or to convey a plural usage, depending at least in part upon context. In addition, the term “based on” or “determined by” may be understood as not necessarily intended to convey an exclusive set of factors and may, instead, allow for existence of additional factors not necessarily expressly described, again, depending at least in part on context.

What is claimed is:

1. A method for training a federated learning model in a federated learning network comprising a server and a plurality of clients, the server maintaining a global federated learning model, the plurality of clients separately maintaining decentralized data sources, the data sources separately storing training datasets for the global federated learning model, the method comprising:

receiving, with a processor circuitry in communication with a client, the global federated learning model from the server via the client, the client controlling remote computing resources;

identifying, with the processor circuitry, a spare computing instance from the remote computing resources;

determining, with the processor circuitry, a threshold training load for training the global federated learning model based on a training load assigned to the client, the threshold training load being a subset of the assigned training load, wherein the training load assigned to the client is n epochs and the threshold training load is at least 50% of the n epochs associated to the training load assigned to the client;

in response to a processing capacity of the spare computing instance being sufficient to process the threshold training load, offloading, with the processor circuitry, the threshold training load to the spare computing instance; and training the global federated learning model on the spare computing instance with the training dataset stored in a data source maintained by the client, in response to the spare computing instance completing the threshold training load but having insufficient processing capacity to complete the assigned training load, transmit a partially trained model update to the server.

2. The method of claim 1, where the method further comprises: in response to the spare computing instance completing the threshold training load, obtaining the partially trained model update corresponding to the threshold training load.

3. The method of claim 1, where the partially trained model update is aggregated into an updated global federated learning model on the server.

4. The method of claim 1, where the method further comprises:

in response to the spare computing instance completing the threshold training load and the spare computing instance being still available, offloading a remainder of the assigned training load to the spare computing instance; and in response to the spare computing instance completing the remainder of the assigned training load, obtaining a completely trained model update corresponding to the assigned training load, and transmitting the completely trained model update to the server, where the completely trained model update is aggregated into an updated global federated learning model on the server.

5. The method of claim 1, where:

the identifying the spare computing instance comprises:

identifying a plurality of spare computing instances from the remote computing resources; and the offloading the training of the global federated learning model to the spare computing instance comprises:

in response to an aggregate processing capacity of the plurality of spare computing instances being sufficient to process the threshold training load, dividing the threshold training load among the plurality of spare computing instances based on processing capacities of the plurality of spare computing instances, and offloading the divided threshold training load to the plurality of spare computing instances respectively.

6. The method of claim 5, where the identifying the plurality of spare computing instances comprises:

obtaining candidate spare computing instances from the remote computing resources; and selecting the plurality of spare computing instances from the candidate spare computing instances based on instance types of the candidate spare computing instances.

7. The method of claim 6, where the selecting the plurality of spare computing instances based on the instance types comprises:

in response to a spare computing instance belonging to a specific instance type being selected, decreasing a selection priority of other spare computing instances belonging to the specific instance type.

8. The method of claim 6, where each of the plurality of spare computing instances has a different instance type.

9. The method of claim 6, where the method further comprises:

selecting the plurality of spare computing instances from the candidate spare computing instances based on consumption metrics.

10. The method of claim 5, where the method further comprises:

in response to the plurality of spare computing instances collectively completing the threshold training load, obtaining trained model updates corresponding to the threshold training load from the plurality of spare computing instances respectively and averaging the trained model updates to form a partially trained model update corresponding to the threshold training load.

11. The method of claim 5, where the method further comprises:

in response to the plurality of spare computing instances collectively completing the threshold training load and at least one of the plurality of spare computing instances being still available, dividing a remainder of the assigned training load among the at least one spare computing instance based on processing capacities of the at least one spare computing instance, offloading the divided remainder of the assigned training load to the at least one spare computing instance respectively.

12. The method of claim 11, where the method further comprises:

in response to the at least one spare computing instance collectively completing the remainder of the assigned training load, obtaining trained model updates corresponding to the assigned training load from the plurality of spare computing instances respectively, and averaging the trained model updates to form a completely trained model update corresponding to the assigned training load.

13. The method of claim 5, where the method further comprises:

in response to one of the plurality of spare computing instances getting unavailable during training, obtaining remaining training load that the spare computing instance fails to complete, dividing the remaining training load among others of the plurality of spare computing instances, and offloading the divided training load to the others of the plurality of spare computing instances respectively.

14. The method of claim 5, where the method further comprises:

in response to all of the plurality of spare computing instances becoming unavailable during training or an aggregate processing capacity of available spare computing instances in the plurality of spare computing instances is insufficient to process an uncompleted training load, selecting and instantiating additional spare computing instances to complete the uncompleted training load.

15. The method of claim 1, where a plurality of clients are selected by the server to participate in training the global federated learning model, and the client is one of the plurality of clients.

16. The method of claim 1, where the method further comprises:

obtaining training parameters for training the federated learning model from the client.

17. The method of claim 1, where the method further comprises:

predicting a time to initialize the training of the federated learning model by the spare computing instance based on historical training records of the spare computing instance.

18. A system for training a federated learning model in a federated learning network comprising a server and a plurality of clients, the server maintaining a global federated learning model, the plurality of clients separately maintaining decentralized data sources, the data sources separately storing training datasets for the global federated learning model, the system comprising:

a memory having stored thereon executable instructions;

a processor circuitry in communication with the memory, the processor circuitry when executing the instructions configured to:

receive the global federated learning model from the server via the client, the client controlling remote computing resources;

identify a spare computing instance from the remote computing resources;

determine a threshold training load for training the global federated learning model based on a training load assigned to the client, the threshold training load being a subset of the assigned training load, wherein the training load assigned to the client is n epochs and the threshold training load is at least 50% of the $\eta$ epochs associated to the training load assigned to the client;

in response to a processing capacity of the spare computing instance being sufficient to process the threshold training load, offload the threshold training load to the spare computing instance; and train the global federated learning model on the spare computing instance with the training dataset stored in a data source maintained by the client, in response to the spare computing instance completing the threshold training load but having insufficient processing capacity to complete the assigned training load, transmit a partially trained model update to the server.

19. A product for training a federated learning model in a federated learning network comprising a server and a plurality of clients, the server maintaining a global federated learning model, the plurality of clients separately maintaining decentralized data sources, the data sources separately storing training datasets for the global federated learning model, the product comprising:

non-transitory machine-readable media; and instructions stored on the machine-readable media, the instructions configured to, when executed, cause a processor circuitry to:

receive the global federated learning model from the server via the client, the client controlling remote computing resources;

identify a spare computing instance from the remote computing resources;

determine a threshold training load for training the global federated learning model based on a training load assigned to the client, the threshold training load being a subset of the assigned training load, wherein the training load assigned to the client is n epochs and the threshold training load is at least 50% of the n epochs associated to the training load assigned to the client;

in response to a processing capacity of the spare computing instance being sufficient to process the threshold training load, offload the threshold training load to the spare computing instance; and training the global federated learning model on the spare computing instance with the training dataset stored in a data source maintained by the client, in response to the spare computing instance completing the threshold training load but having insufficient processing capacity to complete the assigned training load, transmit a partially trained model update to the server.

* * * * *